No. 723,854. PATENTED MAR. 31, 1903.
E. FRANK.
DINNER PAIL.
APPLICATION FILED SEPT. 4, 1902.
NO MODEL.
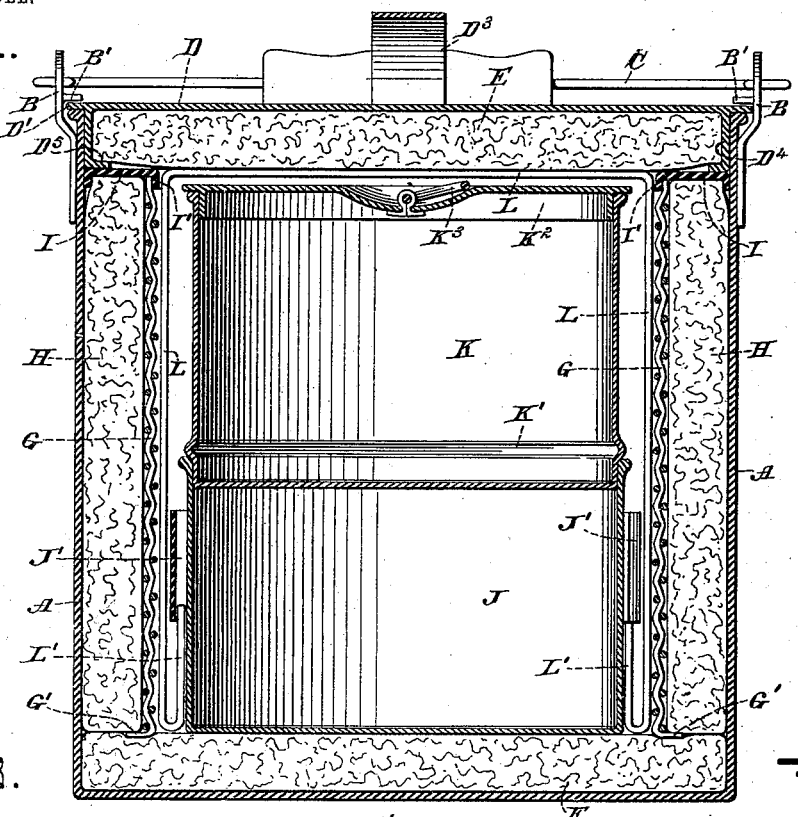
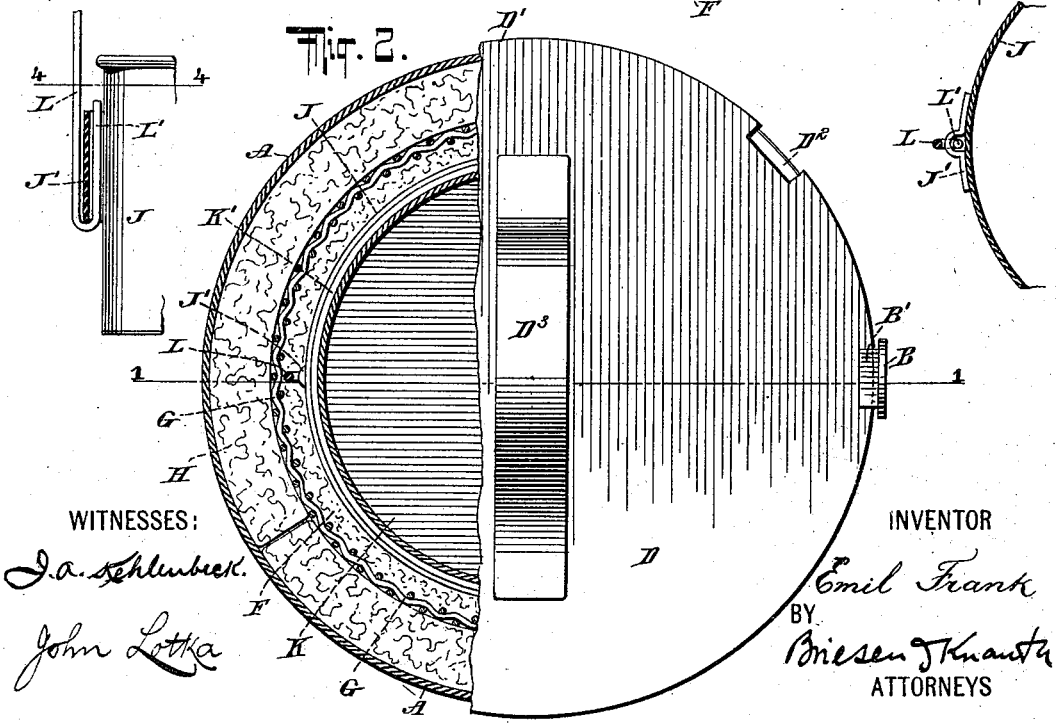
WITNESSES:
J. A. Schlenbeck.
John Lotka
INVENTOR
Emil Frank
BY
Briesen & Knauth
ATTORNEYS

UNITED STATES PATENT OFFICE.

EMIL FRANK, OF NEW YORK, N. Y.

DINNER-PAIL.

SPECIFICATION forming part of Letters Patent No. 723,854, dated March 31, 1903.

Application filed September 4, 1902. Serial No. 122,086. (No model.)

*To all whom it may concern:*

Be it known that I, EMIL FRANK, a citizen of the United States, residing in the borough of Manhattan, city, county, and State of New York, have invented certain new and useful Improvements in Dinner-Pails, of which the following is a specification.

My invention relates to receptacles for preserving food and beverages, so that they will not be influenced by the temperature of the surrounding air, but will keep for a long time at their original temperature. This is particularly of importance in preserving warm food for workingmen who are accustomed to take such food along in a pail when they go to work early in the morning and who do not use the food until five or six hours later. By the aid of my invention the workingman's dinner may be kept warm until the proper time for the meal comes, and not only is the food of an agreeable temperature, but of a pleasant taste and flavor.

The invention is also applicable to the preserving of beverages and of articles, such as ice-cream, which are to be kept cold.

The invention consists in a particular novel construction of a pail or vessel which is superior to articles of the same class used or proposed hitherto in simplicity of construction, ease of cleaning and repairs, and efficiency of protection against the temperature of the surrounding air.

A specific embodiment of my invention will now be described with reference to the accompanying drawings, and then the novel features of the invention will be pointed out in the appended claims.

Figure 1 is a central sectional elevation of a dinner-pail constructed according to my invention, taken on the line 1 1 of Fig. 2. Fig. 2 is partly a top view and partly a sectional plan thereof. Fig. 3 is a detailed elevation of a portion of the inner receptacle, and Fig. 4 is a horizontal section on line 4 4 of Fig. 3.

The improved pail comprises an outer vessel A, which, as shown, is of cylindrical shape; but I desire it to be understood that the shape may be varied. This vessel may be of very simple construction, as shown, consisting, in fact, of a circular bottom with upright side walls which may have a bead at the upper edge. At two diametrically opposite points brackets or ears B may be fastened to the outer vessel A, these brackets serving to receive a handle or bail C, which serves for carrying the dinner-pail in the usual manner. Each of the brackets B is provided with an inwardly-projecting lug B', located at some distance above the upper edge of the outer vessel A, so that a flange D' on the lid or cover D may be received between the said lug B' and the upper edge of the vessel A. This lid or cover has two notches $D^2$ at its periphery, so that the cover may be inserted with the said notches in registry with the lugs B', and by then turning the cover into the position illustrated by Fig. 2 the cover is locked to the vessel A. In order to facilitate turning the cover, I may provide the same with a handle $D^3$. The cover is provided with a vertical wall $D^4$, provided at its lower end with a narrow inturned flange $D^5$, and between this flange and the top of the cover is received a filling E, of a material which is a good insulator against heat. I may, for instance, employ the heat-insulating material which is described in United States Letters Patent No. 688,624, and preferably the material is in the shape of a disk of felt-like structure, so that the entire filling E forms one piece which may be readily applied and removed. At the bottom of the outer vessel A, I locate a disk F of heat-insulating material, which disk closely fits within said vessel.

The utensil further comprises a cylindrical cage G, preferably made of interwoven wires, as shown, or of material which has openings. The lower end of this cage is preferably turned outwardly, as shown at G', thus forming a flange which engages the filling F and upon which rests the filling H of heat-insulating material. This filling H is preferably a rectangular piece of felt-like material, which is folded around the cage G, as shown best in Fig. 2, and which engages the upright wall of the outer vessel A. At the top of the cage G is secured a horizontal flange I, which may be provided with a downwardly-projecting lip I' at its outer periphery, so as to tightly hold the upper end of the filling H.

Within the central space which is left between the bottom filling F and cage G and the filling E of the cover is adapted to be received the food or beverage which it is desired to keep warm or cool. It will be observed that the filling E engages the flange I and that the central space above mentioned is thus entirely inclosed by heat-insulating fillings.

In Figs. 1, 3, and 4 I have illustrated vessels for containing an ordinary meal consisting of soup and meat. The lower receptacle J, which is adapted to contain the meat, is adapted to receive the bottom of the upper receptacle K, which is intended for holding soup. This upper receptacle is provided with a bead K', so as to limit its downward movement, and with a cover K² of any suitable construction. For instance, said cover may have a handle K³ to permit of its being removed more readily. The lower receptacle J is provided upon its outside with sleeves or sockets J' to receive the upturned ends L' of the bail L. When the two receptacles are within the pail, as shown in Fig. 1, the horizontal or top member of the bail L extends at a slight distance above the cover K² and the extremities of the ends L' are within the sockets J' and cannot become disengaged therefrom except by a downward movement of such extent as is normally prevented by the cover K². When, however, the upper receptacle K has been removed, it is possible to slide the bail L downwardly out of the sockets J'. By taking hold of the bail and lifting it to the position shown in Fig. 3 the entire inner receptacle consisting of the receptacles J and K can be removed from the outer receptacle A.

It will be seen that the parts of the improved dinner-pail can be removed singly without the use of tools, so that the entire article may be readily kept clean and repaired. The insulation against temperature influences is very efficient, as I have found by actual trial, and enables workingmen to take out the food at noontime in practically the same condition in which it was put in in the morning. Bottled milk may be kept in such a pail, either warm or cold, for several hours, and this is a great convenience when infants are taken along on outings or journeys. The improved vessel may also be used for carrying ice-cream, which will keep a much longer time than it would otherwise.

It will be understood that in lifting out the cage G the filling H will be removed at the same time, and as the said filling is not attached to any part of the utensil, but simply wrapped around the cage, it is very easy to insert a new filling, or the efficiency of the old filling may be prolonged by simply turning it inside out before again introducing the cage into the outer vessel A. By using a cage or apertured holder for the filling H, I avoid exposing large metallic surfaces adjacent to the vessels J K, which contain the articles to be preserved. At the same time the cage prevents direct contact of the filling with the said receptacles and keeps the filling in proper shape.

Various modifications may be made without departing from the nature of my invention.

I claim and desire to secure by Letters Patent—

1. A pail for protecting hot or cold articles against the influence of outside temperature, comprising an outer vessel, a layer of heat-insulating material at the bottom of said vessel, a cage arranged within the vessel and spaced from the walls thereof, said cage being provided with outwardly-extending flanges at its top and at its bottom, another layer of heat-insulating material wrapped around said cage between the flanges thereof and engaging the side wall of the outer vessel, and a cover for the top of the vessel, said cover being provided with a heat-insulating filling which is exposed upon the lower surface of the cover and is adapted for engagement with the upper flange of the cage.

2. A pail for protecting hot or cold articles against the influence of outside temperature, comprising an outer vessel, an apertured cage arranged within the vessel and spaced from the walls thereof, said cage being provided at the bottom with an outwardly-extending flange, and a layer of heat-insulating material surrounding said cage and resting on the flange thereof.

3. A pail for protecting hot or cold articles against the influence of outside temperature, comprising an outer vessel, a cage set therein, insulating material between said cage and the bottom and sides of the outer vessel, an insulating-cover for said vessel, a lower receptacle adapted to be received within the cage and provided with sockets upon its outer walls, an upper receptacle adapted to fit the top of the lower receptacle, and a removable bail, the ends of which are turned upwardly to normally fit into said sockets, while the upper or cross member of the bail extends above the upper receptacle which in the normal position prevents the bail from being detached from its sockets.

In testimony whereof I have signed my name to this specification in the presence of two subscribing witnesses.

EMIL FRANK.

Witnesses:
PHILIPP SIEGEL,
AUGUST ZORN.